United States Patent Office 3,431,684
Patented Mar. 11, 1969

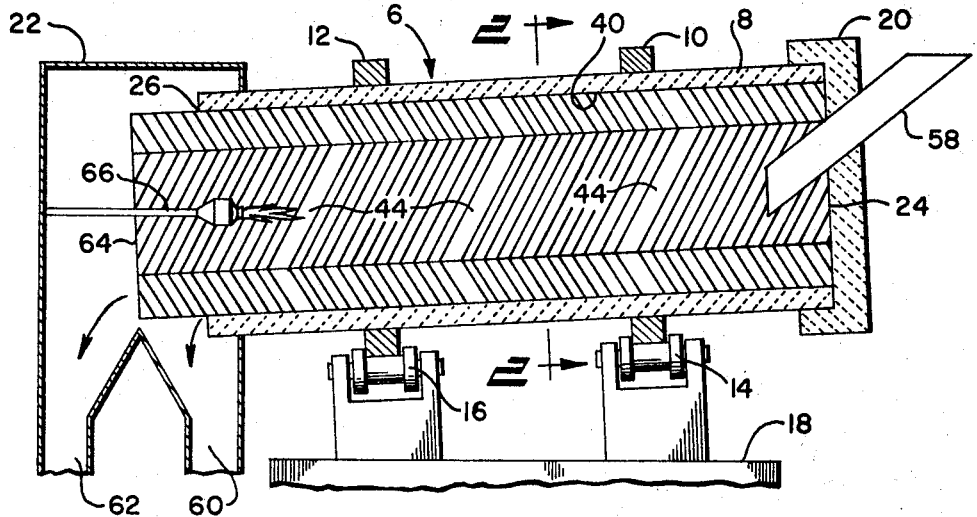
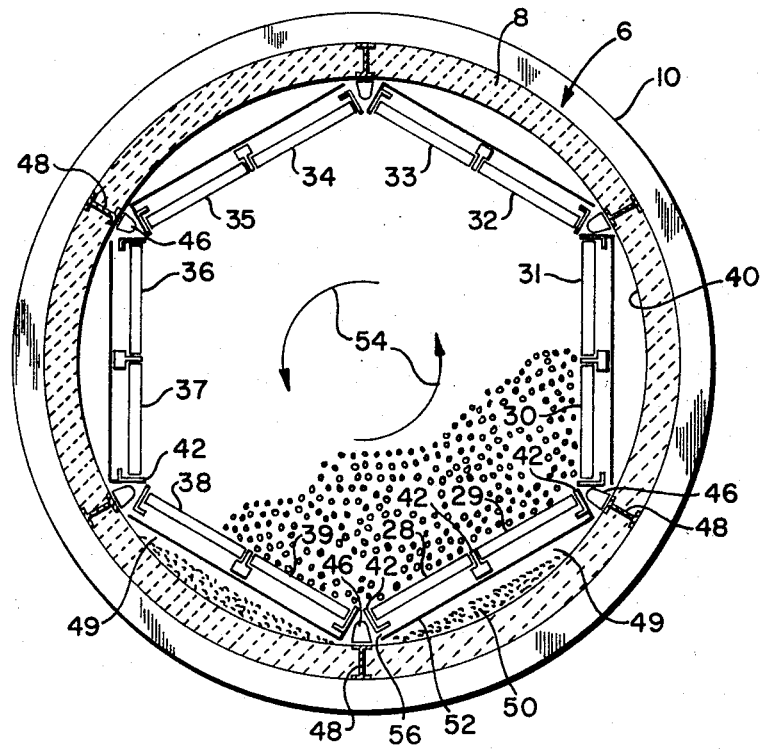

3,431,684
ROTARY ABRADING DEVICE
Thomas E. Ban, Cleveland Heights, Ohio, assignor to McDowell-Wellman Engineering Co., a corporation of Ohio
Filed Oct. 27, 1966, Ser. No. 589,967
U.S. Cl. 51—164                 6 Claims
Int. Cl. B24b 31/02, 1/00; B02c 17/00

ABSTRACT OF THE DISCLOSURE

There is provided an apparatus for abrading particles and including a drum rotatable about its axis, which axis is inclined to the horizontal, and having disposed within the drum and secured thereto for rotation therewith a plurality of grate surfaces forming a polygon within the drum, which grate surfaces are at least coextensive with the drum and preferably extend beyond the drum, and means for introducing particulate matter at the upper end of the drum, and means at the discharge or lower end of the drum for separating fines and abraded particles.

---

This invention as indicated relates to a rotary abrading device.

Carbonized pellets processed on traveling grate machines are hot carbon bonded spheroidal specimens of composited prereduced iron ore, pyrolytic char and precalcined limestone. The processed pellets, however, have rough outer surfaces caused by weakly adhering particles. During the process, fines from spalled pellets are attracted to the roughened pellet surfaces and adhere to the pellets making them less desirable for use in a smelting furnace.

The pellets are highly improved by removing the weakly adhering particles and fines prior to msleting. The pellets when carbonized reach temperatures of approximately 1400° F. to 2000° F. It is important to preserve this temperature and the chemical composition of the charge of pellets, if high efficiency smelting operations in an electric furnace are to be maintained. The roughened surfaces of the carbonized pellet naturally exposes greater areas of the pellet causing more rapid cooling of the pellets, which in turn requires increased amounts of electrical energy for smelting. Also such charges oxidize, lose carbon and gain oxygen which cause increasing fuel and energy requirements. The fines adhering to the roughened surfaces of the pellets cause furnace operation problems as the pellets soon become abundant with fines from the mild attrition of pellets in the charging chutes which carry the pellets to the electric smelting furnaces. This invention is directed to preserving the beneficial quality of carbonized pellets by removal of the fines and smoothening or abrading the roughened outer surfaces of the pellets.

Briefly stated, the invention is in a hot rotary trommel sizing device which acts to ruble hot carbonized pellets while performing sizing operations and preserving heat and chemical properties. In accordance therewith, there is provided a refractory lined elongated drum mounted for rotation about its longitudinal axis which is inclined from the horizontal. The drum is preferably sealed at both ends and is provided with a plurality of grates which are mounted around the inner surface of the drum for rotation with the drum. The grates are loosely mounted such that they oscillate or jangle as the drum rotates. The grates form a grating system which is at least coextensive with the drum and spaced from the inner surface of the drum forming a recess for receiving fines passing through the grates from the abrading process. A chute is provided at the most inclined end of the drum for charging unabraded pellets into the drum between the grates. Two separate discharge outlets are provided at the other end of the drum, one outlet being in communication with the recess for removing the fines, and the other outlet being in communication with the grates for removing pellets whose roughened surfaces have been smoothened by abrasion as the pellets tumbled between the rotating grates in passing longitudinally through the drum.

The following description of the invention will be better understood by having reference to the annexed drawing wherein:

FIG. 1 is a side sectional view of a rotary abrading drum of this invention; and FIG. 2 is a cross-sectional view of the drum taken in the plane indicated by the line 2—2 of FIG. 1.

Referring more particularly to the drawing, there is shown an elongated drum 6 which is preferably lined with a refractory material 8. The drum 6 is mounted for rotating about its longitudinal axis which is inclined from the horizontal.

Any conventionally designed rotary mounting can be used. For example, annular rings 10 and 12 secured to the drum 6 in spaced realtion, are mounted for rotation on rollers 14 and 16, respectively. The longitudinal axis or the drum 6 can be tilted or inclined to the horizontal by mounting the rollers 14 and 16 in varied spaced relation from a drum supporting surface such as the ground 18.

The drum 6 is journalled for rotating in caps 20 and 22 used for sealing the open drum ends 24 and 26, respectively, from the ambient atmosphere.

A plurality of grate bars or grates, e.g., grates 28–39 are disposed around the inner periphery 40 of the drum 6 and are mounted for rotation with the drum 6.

The grates are similar to the high temperature grates provided in traveling grate machines and are supported in pallet-like retainers 42 in the rotary kiln or drum 6. The grates and retainers 42 form a grating system 43 which is at least coextensive with the drum 6. The grate retainers 42 prove highly beneficial as the grates are lightly stressed and can operate at temperatures up to 1800° F. without extensive mechanical problems.

The grates are disposed side-by-side and in end-to-end relation in the pallet type retainers or grate holders 42 (FIGS. 1 and 2). The grates are loosely mounted on the grate retainers 42, such that they jangle or oscillate as they rotate with the drum 6 to shake loose or dislodge any fines adhering to the grates. The grates are preferably mounted in inclined or racked positions such as a herringbone pattern (FIG. 1). Conventionally-designed grate spacers 44 are provided to maintain the grate bars in the slanted arrangement of the herringbone pattern.

The grate retainers 42 are mounted between supports 46, which are spaced around the drums inner periphery 40 and secured to conventional structural beams 48 embedded in the refractory lining 8. The supports 46 hold the grate retainers 42 and grates in spaced relation from the inner periphery 40 of the drum 6, forming a recess or space 49 for receiving fines 50 which result from the abrading process and trickle through the grates 28–39. The grate retainer supports 46 are provided with intermittent openings to allow fines to circulate freely in the recess 49 as the drum 6 rotates.

Each grate retainer 42 is provided with a fines chute 52 for keeping the fines 50 in the recess 49, and from repassing through the grates as the grates rotate (note arrows 54 indicating direction of rotation). Each fines chute 52 is solid being formed of heat resistant metal, and covers the bottom or underside of each grate retainer 42.

Each fines chute 52 is free of the grates and members forming the grate retainer 42, and is slanted or tilted in relation to the face of the grates to provide an opening 56 at one side of the grate retainer 42. The fines 50 from the abrading process trickle through the grates and openings 56 into the fines receiving recess 49. The fines chutes 52 are arranged such that any fines jarred loose from the drum's inner periphery 40 as the drum 6 rotates, will be directed back into the fines receiving recess 49 and not pass back through the grates and tumbling pellets to disrupt the abrading process.

A pipe chute 58 is provided at the most inclined end 20 of the drum 6 for charging unabraded pellets into the drum 6 between the grates. The charging chute 58 is secured to the cover seal 24, and extends into the drum 6 between the grates.

A pair of separate hoppers or chutes 60 and 62 are provided at the discharge ends 26 and 64, respectively, of the drum 6 and grates for receiving and removing the fines and abraded pellets. The discharge hoppers or outlets 60 and 62 can be secured to, and extend from the cover seal 22.

The discharge hopper 60 for receiving the fines is disposed such that it communicates with the recess 49 between the grates and inner periphery 40 of the drum 6. The discharge end 64 of the grating system 43 preferably extends beyond the discharge end 26 of the drum 6 and into the cover seal 22.

*Operation*

Unabraded pellets are charged to the grates on the drum 6 through the charging chute 58. The pellets move longitudinally through the drum 6 as they are tumbled between the rotating grates. The pellets as they tumble through the air and against each other are abraded such that their roughened outer surfaces become smoothened and the fines embedded in the roughened surfaces are removed. The fines and abraded pellets are separately discharged into the hoppers 60 and 62 and removed from the rotary drum 6.

The rotary abrading drum 6 is preferably sealed at both ends to prevent oxidation and heat transfer from the air. Fines which inadvertently leak through the seals are removed by suitable vacuum fans such that the sizing and abrading operation takes place entirely without air sweeping.

The grates prior to the abrading process can be heated to maintain the temperature of the pellets between 1400° F. to 2000° F. Another way of maintaining the pellet temperature is to provide a torch 66 within the drum 6. This can be accomplished by mounting the torch 66 on the cover seal 22, the torch 66 extending into the drum 6 between the grates at the drum end 64. The torch 66 is used to ignite and heat the gases which pass through the pellets as they tumble between the grates. The ignition and heating of the gases within the abrading drum 6 also helps to reduce the fines containing gases which leak through the seals during the abrading process.

Thus, there has been provided a rotary device for abrading hot carbonized pellets. The device has many self-cleaning features and simple systems for removing fines from the abraded pellets. Further, no air sweep is necessary for removing dust because adequate provisions can be maintained for dust removal at the seals of the drum or device.

What is claimed is:

1. A rotary abrading apparatus comprising in combination:
    (a) an elongated hollow drum mounted for rotation about its longitudinal axis, said axis being inclined with respect to the horizontal;
    (b) a polygonal grate structure including a plurality of individual grate elements loosely held by supports and collectively defining a polygon disposed within said drum and secured to the inner surface thereof, said polygonal grate structure being at least coextensive with the longitudinal extension of the drum;
    (c) a fines-receiving space between the drum and each side of said polygonal grate structure;
    (d) stationary means for introducing material to be abraded into said polygonal grate structure adjacent the upper end of said hollow drum;
    (e) stationary means adjacent the lower end of said drum for receiving and isolating material discharged from the space between said drum and said polygonal grate system; and
    (f) stationary means for receiving and isolating abraded material from said polygonal grate structure.

2. The device of claim 1 which includes means for sealing each end of the hollow drum from the ambient atmosphere.

3. The device of claim 1 which includes refractory material for lining the inner surface of the drum adjacent the grates.

4. The device of claim 1 which includes means for at least partially sealing the grates adjacent the drum's inner surface such that as the grates rotate, fines from the abrading process passing through the grates will be directed into the recess, and kept from repassing through the grates for contact with material tumbling between the grates.

5. The device of claim 1 wherein the grating system comprises rows of grates in side-by-side relation, each row being in abutting relation to adjacent rows, and the grates in each row are angularly disposed to the grates in adjacent rows forming a herringbone pattern.

6. The device of claim 1, which includes a torch disposed within the polygonal grate structure of the drum for igniting gases within the drum to maintain pellet temperatures.

References Cited

UNITED STATES PATENTS 1,770,013  7/1930  Rich _____ 51—164 X
2,104,040  1/1938  Hurt _____ 110—14

HAROLD D. WHITEHEAD, *Primary Examiner.*

U.S. Cl. X.R.
110—14; 241—179; 51—314